(12) United States Patent
Tsai (10) Patent No.: US 7,224,467 B2
(45) Date of Patent: May 29, 2007

(54) SYSTEM FOR ROTATION MEASUREMENT WITH LASER INTERFEROMETRY

(75) Inventor: John C. Tsai, Saratoga, CA (US)

(73) Assignee: Excel Precision Corporation, Santa Clara, CA (US)

( * ) Notice: Subject to any disclaimer, the term of this patent is extended or adjusted under 35 U.S.C. 154(b) by 288 days.

(21) Appl. No.: 10/711,090

(22) Filed: Aug. 20, 2004

(65) Prior Publication Data
US 2005/0041254 A1    Feb. 24, 2005

Related U.S. Application Data

(60) Provisional application No. 60/481,269, filed on Aug. 20, 2003.

(51) Int. Cl.
*G01B 11/02* (2006.01)
(52) U.S. Cl. .................................... 356/496
(58) Field of Classification Search ................ 356/496, 356/498, 508
See application file for complete search history.

(56) References Cited

U.S. PATENT DOCUMENTS

| | | | | |
|---|---|---|---|---|
| 5,747,797 A | * | 5/1998 | Fujita | 250/231.14 |
| 5,920,392 A | * | 7/1999 | Tsai et al. | 356/498 |
| 6,124,929 A | * | 9/2000 | Weibel | 356/451 |
| 6,603,539 B1 | * | 8/2003 | Meier | 356/139.03 |
| 2002/0093663 A1 | * | 7/2002 | Tsai | 356/498 |

* cited by examiner

*Primary Examiner*—Gregory J. Toatley, Jr.
*Assistant Examiner*—Michael A. Lyons
(74) *Attorney, Agent, or Firm*—Raymond E. Roberts; Intellectual Property Law Offices (57) ABSTRACT

An apparatus for use in rotational measurement. A rotational assembly is provided that is rotationally movable about a rotational axis. At least two interferometers are provided that are each able to receive a respective light beam, separate it into both reference and measuring beams and direct their respective measuring beam to and receive it back from the rotational assembly. The said rotational assembly includes a plurality of cube corners mounted so that at least one is able to receive from and reflect back to one of the interferometers its measuring beam as the rotational assembly rotates. The interferometers combine their reference and measuring beams into respective detection beams, wherein at least one such detection beam includes an interference signal that is process able to determine any rotational measurement of the rotational assembly and any work piece target attached to it.

7 Claims, 9 Drawing Sheets

In differential mode the laser beam is split into two components by the interferometer optics. Both components shine on two cube corners (on the same plane) that are mounted on the same mechanical arm. When the arm rotates, one cube corner moves forward and the other retreats. This causes a Doppler frequency increase for one component and a decrease for the other. The frequency difference divided by the arm length is the rotated angle. This calculation does not require knowledge of the rotation axis location.

SYSTEM FOR ROTATION MEASUREMENT WITH LASER INTERFEROMETRY

This application claims the benefit of U.S. Provisional Application No. 60/481,269, filed Aug. 20, 2003.

TECHNICAL FIELD

The present invention relates generally to the field of optical measurement, and more particularly to accurately detecting rotation characteristics of a work piece. It is anticipated that primary applications of the present invention will be in manufacturing of highly precise assemblies and in industrial and laboratory processes requiring high precision position detection and control.

BACKGROUND ART

The laser interferometer is widely used as a length standard due to its ability to provide very high accuracy. For example, almost all CNC and CMM machines in use today in machine shops and factories are routinely calibrated by laser interferometer to ensure accurate performance. Another example is the manufacture of high density semiconductor chips. This is made possible by the laser interferometer, which allows the photomasks for circuitry to be projected on to small areas of wafers. In sum, the laser interferometer plays a crucial role in the advancement of modern technology.

Figure 1A:
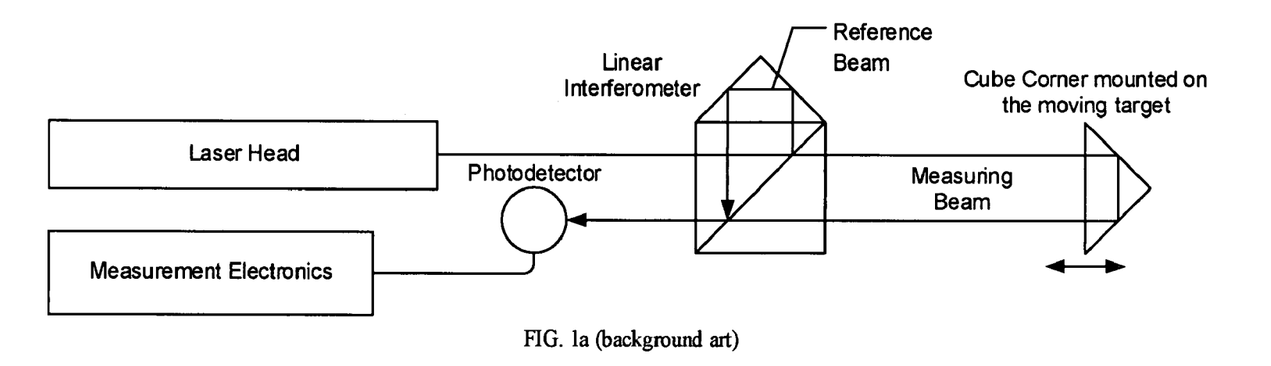
FIG. 1a (background art) are a block diagrams showing the basic concepts of linear measurement with a laser interferometer, wherein FIG. 1b (background art) is a block diagram showing λ/4 plates to the interferometer of FIG. 1a to direct laser beams normal to the direction of the incident beam.

FIG. 1a (background art) is a block diagram showing the basic concepts of linear measurement with a laser interferometer. In this depiction, an outgoing laser beam goes through a beam splitter and is separated into two components. One component, a reference beam, is reflected to a reference cube corner and returns in the opposite direction. The other component, a measurement beam, transmits though the beam splitter and shines on a target cube corner which is mounted on a target object. The measuring beam also returns in the opposite direction, and interferes with the reference beam. Both the reference and measuring beams have an offset caused by the cube corners. The interference signal is at a maximum when these offsets are equal for both beams.

Figure 1B:
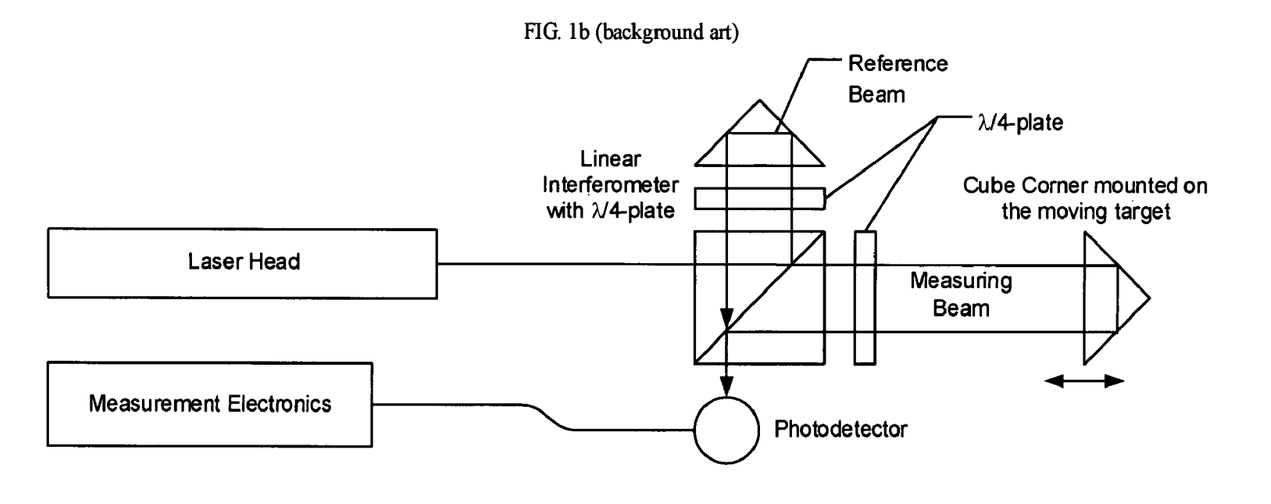

There is no offset if both beams are shining at the apex of cube corners, but the laser beams will then coincide with the outgoing beam from the laser head. There is no place to put the detector in this case and a modification of optical configuration will be needed. For example, quarterwave plates can be placed between the interferometer optics and the target so that the returning laser beams are directed to the direction normal to the original direction. FIG. 1b (background art) is a block diagram showing λ/4 plates added to the interferometer to direct laser beams normal to the direction of the incident beam.

Unfortunately, the laser interferometer has a major limitation in that it can only measure the movement of an object in a straight line. Angular measurement is difficult when a target object moves out of the laser beam path, because the signal is then lost. This is why "angular interferometers" today have a limited measurement range, typically of less than 35 degrees. (Examples of such angular interferometers are provided commercially by Excel Precision Corporation, Agilent Technologies, and Renishaw PLC.)

Figure 2:
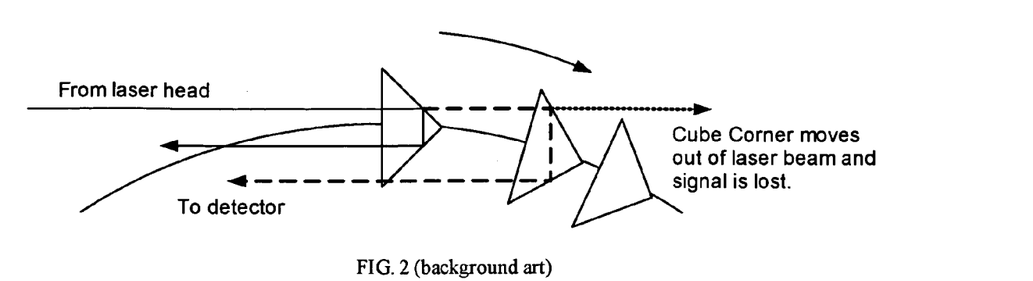
FIG. 2 (background art) is a block diagram showing what happens when the cube corner on the targeted object an interferometer such as those of FIGS. 1a–b in moves in an arc.

FIG. 2 (background art) is a block diagram showing what happens when the cube corner on the target object moves in an arc. The cube corner moves out of the laser beam's path and the signal is lost. The displacement of this transverse movement is determined by $2*R*(1-\cos\theta)$, where $\theta$ is the rotational angle and R is the radius of rotational curvature. The maximum path of the arc at which measurement can continue is at the angle where the reference and measuring beams have smallest overlap but still produce adequate interference.

Theoretically, the closer the cube corner is to the rotation center, the less displacement of offset will occur. The structure of the cube corner, however, has a limitation of its acceptance angle. This full acceptance angle is approximately 40 degrees. So, shortening the radius of the rotation does not bring much advantage. For a 6 mm diameter laser beam, the most ideal radius is approximately 30 mm, and the full acceptance angle is approximately 35 degrees.

Due to the limitation just discussed, the progress of rotational measurement in industry is not as advanced as the progress of linear measurement. Traditional autocollimators are still used in most angular measurement, but these are not only less accurate but also more time consuming. For example, calibration of the X-, Y-, and Z-axes in a manufacturing or laboratory environment typically takes only thirty minutes by laser interferometer, but the rotational measurement of a single axis alone typically takes more than thirty minutes when done by autocollimator.

It therefore follows that the metrology community is badly in need of a laser interferometry technique for rotational measurement, particularly one suitable to measure rotational movement through a complete circle.

DISCLOSURE

Accordingly, it is an object of the present invention to provide system for rotation measurement using interferometry.

Briefly, one preferred embodiment of the present invention is an apparatus for use in rotational measurement. A rotational assembly is provided that is able to rotate about a rotational axis. At least two interferometers are also provide, wherein each is able to receive a respective light beam, to separate said it into both a reference beam and a measuring beam, to direct said its measuring beam to the rotational assembly, and to receive its measuring beam back from the rotational assembly. The rotational assembly includes a number of cube corners mounted such that at least one is always able to receive from and reflect back to one of the interferometers its respective measuring beam as the rotational assembly rotates about the rotational axis. The interferometers then each are further able to combine their respective reference and measuring beams into a detection beam. At least one of these detection beams then includes an interference signal that can be processed to measure the rotational movement of the rotational assembly and any work piece target attached to it.

An advantage of the present invention is permits rotational measurement, in excess of 30 degrees and even throughout 360 degree rotations.

Another advantage of the invention is that it can operate in either a linear mode, provided that the axis of rotation is known, or in a differential mode, wherein the axis of rotation need not be known.

And another advantage of the invention is that it may employ essentially conventional elements, albeit in a heretofore not known approach, to provide the economy, efficiency, and particularly the accuracy of interferometric measurement for rotational measurement.

These and other objects and advantages of the present invention will become clear to those skilled in the art in view of the description of the best presently known mode of carrying out the invention and the industrial applicability of the preferred embodiment as described herein and as illustrated in the figures of the drawings.

DESCRIPTION OF DRAWINGS

The purposes and advantages of the present invention will be apparent from the following detailed description in conjunction with the appended figures of drawings in which:

FIG. 6A-C (extending across three pages) is a flow chart showing a process suitable for measurement in three planes, with each plane having four cube corner pairs that are 90° apart.

In the various figures of the drawings, like references are used to denote like or similar elements or steps.

BEST MODE

A preferred embodiment of the present invention is a rotational measurement system. As illustrated in the various drawings herein, and particularly in the views of FIG. 3-7, some exemplary preferred embodiments of the invention are depicted by the general references 10, 50, 100, and 150.

Figure 3:
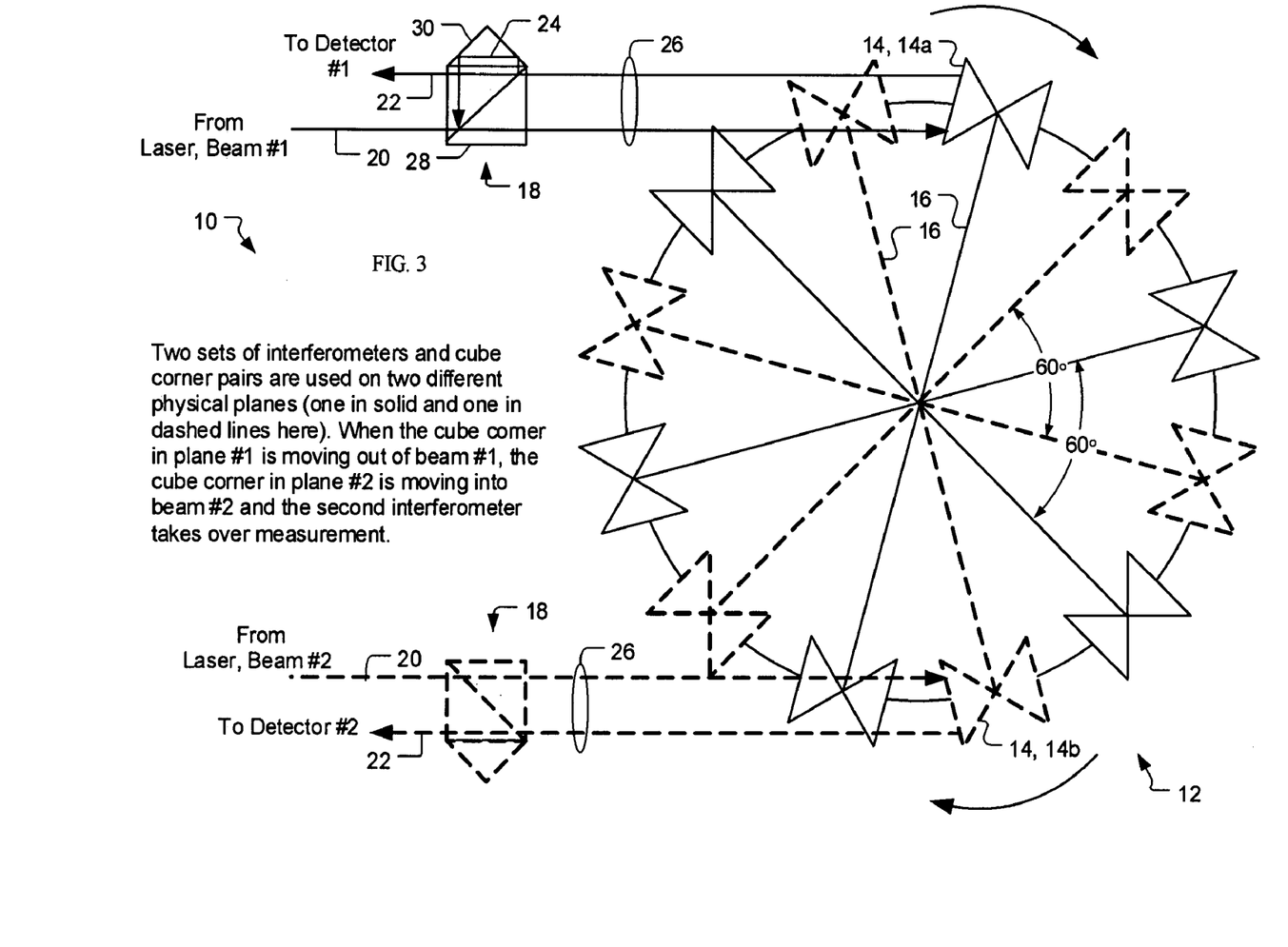
FIG. 3 is a stylized top view of an embodiment of a rotational measurement system that operates in two planes and is in accord with the present invention.

FIG. 3 is a stylized top view of an embodiment of a rotational measurement system 10 that operates in two planes and is in accord with the present invention. The apparatus of the rotational measurement system 10 in one plane is shown here in solid outline and the apparatus on the other plane is shown in dashed outline.

The rotational measurement system 10 includes a rotary assembly 12 that consists of twelve pairs of cube corners 14, arranged as opposed units that are mounted at respective ends of mechanical arms 16, as shown. These mechanical arms 16 extend so that the pairs of cube corners 14 are 30° apart, and thus so that the twelve pairs cover the complete 360° range of a full circle.

The rotational measurement system 10 also includes two interferometers 18 and one or more lasers (not shown here) that produce two laser beams 20. As is now described, the laser beams 20 become detection beams 22 that can be detected by two detectors to provide signals that are processed by measurement electronics (not shown here).

Since the maximum angle at which a laser interferometer can typically be used to measure is approximately 35°, the arrangement of the rotary assembly 12 is made such that there will always be one cube corner 14 available for measurement wherever the rotary assembly 12 is located. In the rotary assembly 12 here an extra 5° of angular range is provided that allows the next pair of cube corners 14 to take over measurement when the rotary assembly 12 rotates by 30°, i.e., as the previous pair is reaching its 30° range limitation. This ensures that there is no interruption when measurement is greater that 30° or even through a full circle.

Ideally, one would put all twelve pairs of cube corners 14 in the same plane. However, that is physically difficult because their size can cause them to block beam paths if the length of the mechanical arms 16 of the rotary assembly 12 are not long enough to provide adequate clearance. To deal with this, the twelve pairs of cube corners 14 can then be placed on multiple planes, as is done in the rotational measurement system 10.

Depending on the size of the cube corners 14 and the length of the mechanical arms 16 that one chooses, the physical dimension of the cube corner 14 in the previous pair might block the path of the laser beam 20 to the next cube corner 14. Therefore, the number of the pairs of cube corners 14 can be six pairs that are respectively mounted 60° apart in the two measurement planes, to receive beam components from the two laser beams 20 as shown in FIG. 3.

Figure 4:
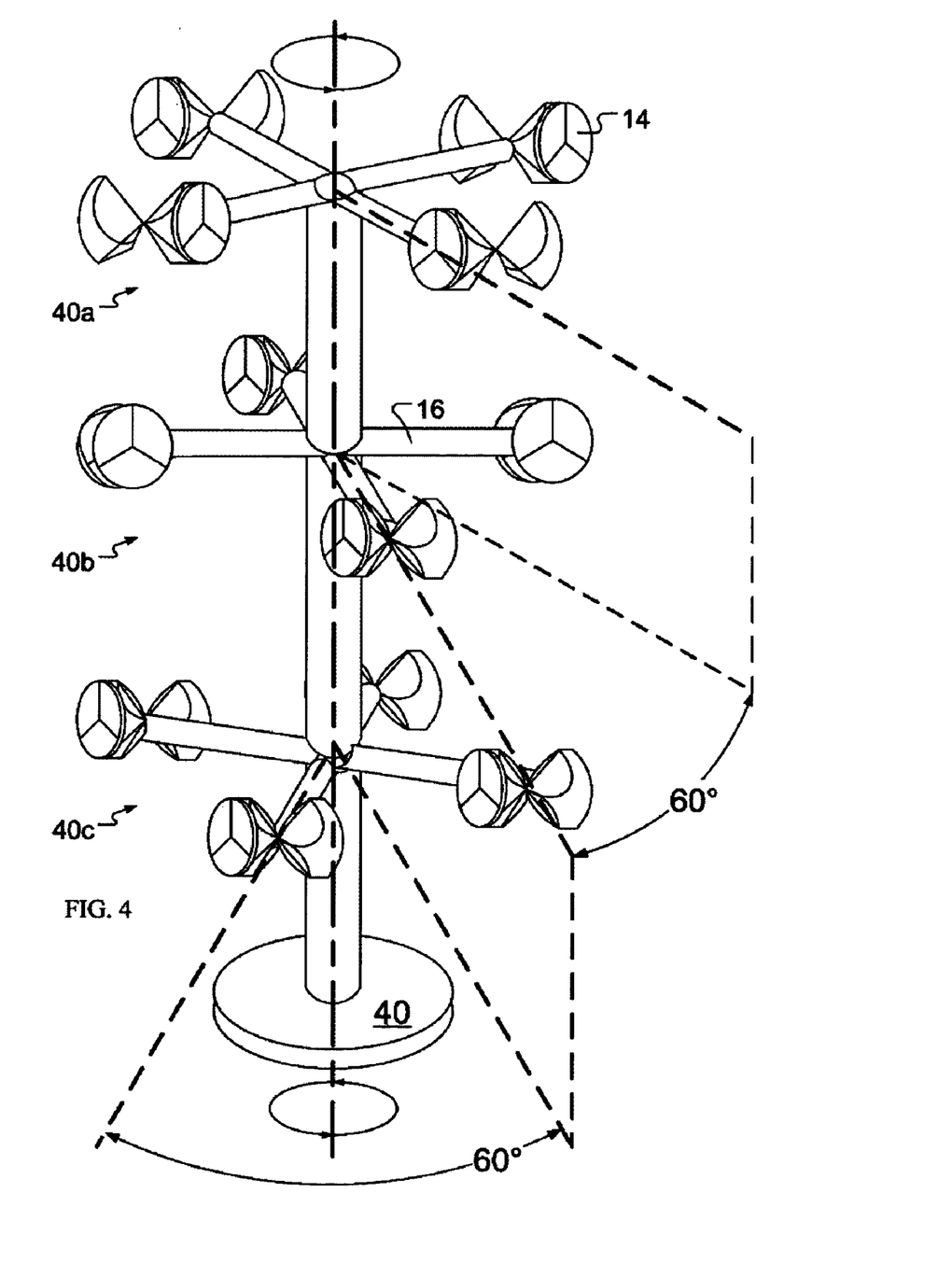
FIG. 4 is a perspective views showing a 3-plane rotary assembly based on an extension of the concept described for FIG. 3.

FIG. 4 is a perspective views showing a rotary assembly 40 based on an extension of the concept just described for FIG. 3. The rotary assembly 40 here has three measurement planes 42a–c each including four pairs of cube corners 14 mounted on two mechanical arms 16 such that the pairs in a respective plane are 90° apart, and such that the cube corners 14 in adjacent planes are 30° apart. This rotary assembly 40 can be used with three laser beams (not shown here), and is used in the example embodiment of the invention depicted in FIG. 7 (discussed presently).

Continuing now with FIG. 3, during measurement the laser beam 20 from a single laser head is preferably split into several beam components to each measure the rotation in one measurement plane. That is, a single laser head is preferably used to produce all of the laser beams 20 in an embodiment. When a first laser beam component is reaching the full angular range of a cube corner 14 in its plane, thereby limiting the utility of the interferometer 18 in that plane, a second laser beam component, cube corner 14, and interferometer 18 in the other measurement plane take over, etc., with this process simply repeated as each cube corner 14 reaches its full measurement angle.

The most straightforward way to perform position measurement is to use a single-path interferometer (i.e., an interferometer in which the measuring beam shines on a target only once; verses a multiple-pass interferometer in which the measuring beam shines on the target more than once, thus increasing resolution). For the sake of simplicity the examples used herein use single-path interferometers. Once those examples are studied, however, those of ordinary skill in the art will readily appreciate how this invention may also be embodied with multi-pass interferometers.

Linear Mode

FIG. 3 further illustrates how the rotational measurement system 10 can operate in a linear mode. The rotary assembly 12 is first attached to the rotational axis of a work piece (not shown). This permits the cube corners 14 to act as optical targets and it follows that when the position and movement of such an optical target is known, the position and movement of the attached work piece target is also known.

The linear measurement mode is suitable when the rotational center is known, and measurement can then be conducted as follows. Both a reference beam component 24 and a measuring beam component 26 are provided from the laser beam 20, for instance, in essentially the same manner as discussed for FIGS. 1a–b (background art). The reference beam component 24 is reflected by a beam splitter portion 28 into a cube corner portion 30 of the interferometer 18, and then reflected back. The measuring beam component 26 passes through the beam splitter portion 28 of the interferometer 18, is reflected by a cube corner 14 in the rotary assembly 12, and is also reflected back. The returning beam components 24, 26 then recombine in the interferometer 18 and produce the detection beam 22 including an interference signal.

When the mechanical arm 16 of the rotational measurement system 10 is rotating, a targeted cube corner 14 moving toward the measuring beam component 26 observes an increase of frequency. Conversely, a targeted cube corner 14 moving away from the measuring beam component 26 observes a decrease of frequency. This occurs due to the well known "Doppler shift" principle, discussed in many references. When the reference beam component 24 and the measuring beam component 26 are combined again, the interference that has resulted is directly related to the velocity of the movement of the target cube corner 14, and information about the total displacement of that cube corner 14 can be extracted in conventional manner.

With continued reference to FIG. 3, pairs of cube corners 14 are shown there but it should be noted that single cube corners 14 can also be used in embodiments where only linear mode measurement is performed. However, since the inventor anticipates that most embodiments of this present invention will be used interchangeably for both linear and differential mode measurement, or exclusively for differential mode measurement, it is expected that most embodiments of the invention will use pairs of the cube corners 14.

Differential Mode

In many cases the exact location of the rotational axis of a target is not well known and the measured results from the linear mode will not be accurate. To handle such cases, simultaneous measurement for the movement of two cube corners 14 may be used. Since both are performing measurement during rotation and the separation between them can be exactly known, the positional difference between readings divided by the separation length between the two targeted cube corners 14 here gives one the angle of rotation. Differential operation therefore does not require a knowledge of the exact position of the rotational axis, beneficially eliminating the need to place the optically targeted portion of an embodiment of the present invention operating in differential mode at the exact rotational axis.

For example, the rotational center of the rotation table of a CNC or CMM machine is sometimes not easily identified during actual measurement scenarios. The differential measurement technique that the present invention permits can therefore be very useful during the initial hardware set-up of such machines.

Figure 5:
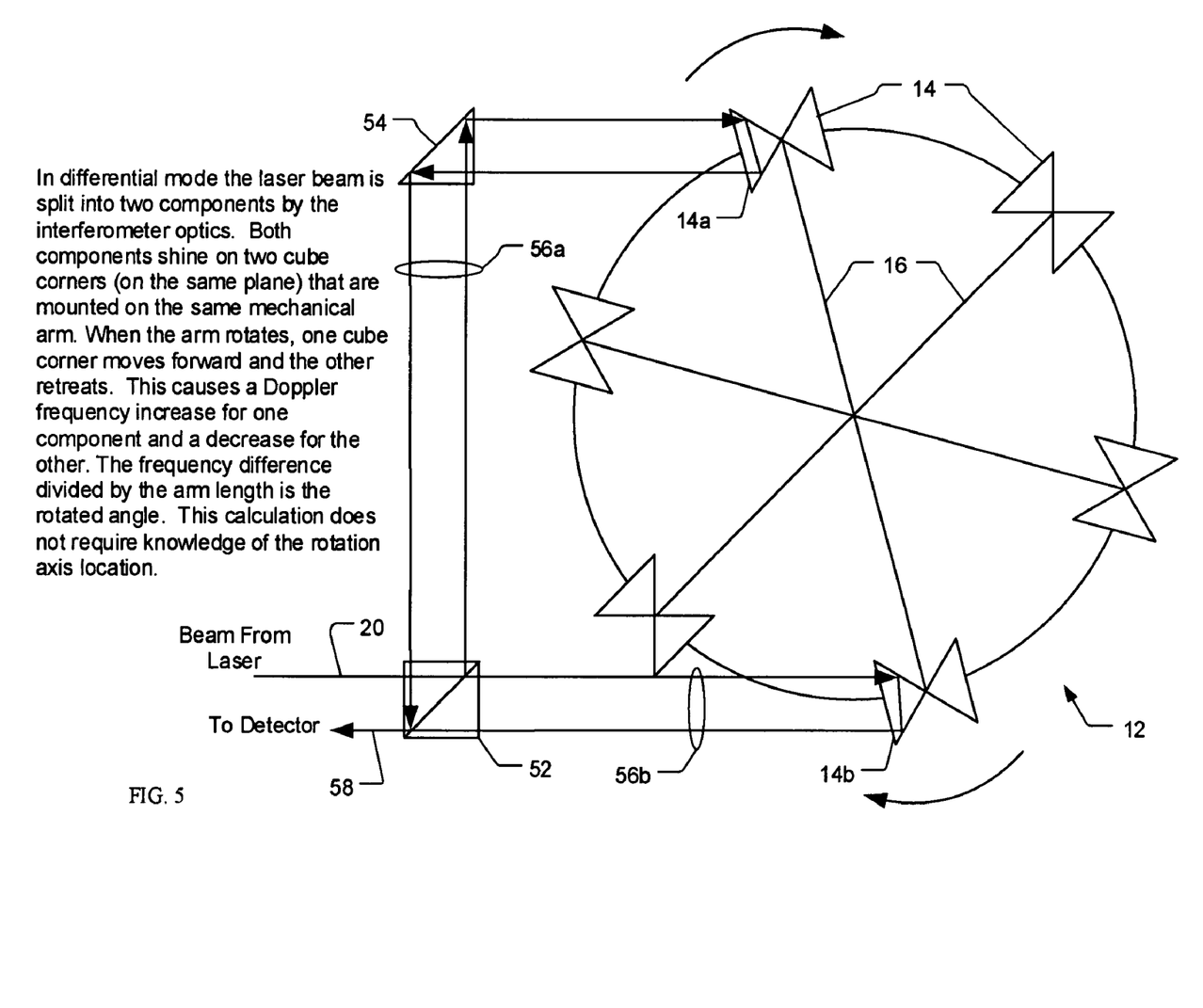
FIG. 5 is a stylized top view showing a rotational measurement system, in accord with the present invention, that is suitable for performing differential mode measurement.

FIG. 5 is a stylized top view showing a rotational measurement system 50, in accord with the present invention, that is suitable for performing differential mode measurement. To simplify the explanation, measurement on only one plane is shown here. The very same rotary assembly 12 with cube corners 14 and mechanical arms 16 as used in the rotational measurement system 10 (FIG. 3) may be used here. The interferometer optics in the rotational measurement system 50, however, include a beam splitter 52 and a beam bender 54, in place of each interferometer 18 in the rotational measurement system 10.

The laser beam 20 from a laser head (not shown here) is split by the beam splitter 52 into two beam components 56a–b. The first beam component 56a is reflected by the beam splitter 52 to the beam bender 54, which is situated at a location where it can direct that first beam component 56a to shine on a cube corner that is currently positioned to be available for measurement, specifically, cube corner 14a in FIG. 5. The second beam component 56b transmits through the beam splitter 52 and shines on another cube corner, specifically cube corner 14b in FIG. 5, which is mounted on the opposite end of the mechanical arm 16 from cube corner 14a.

When the mechanical arm 16 here rotates the cube corner 14a so that it is moving away, the first beam component 56a "sees" a decrease of frequency. Conversely, the cube corner 14b at the opposite side of the mechanical arm 16, will be moving towards, and the second beam component 56b "sees" an increase of frequency. These two beam components 56a–b are then recombined into a returning detection beam 58 in which an interference signal is formed. In particular, the interference here is directly related to the velocity of the movements of the targeted cube corners 14a, 14b and information about the total displacement of a target object attached to the rotary assembly 12 can now be extracted in conventional manner.

With continued reference FIG. 5, pairs of cube corners 14 are shown there and this is necessary in the rotational measurement system 50. The cube corners 14 here are mounted back-to-back because of the rotational requirement that one half of a pair works with the first beam component 56a while the other half of the pair works with the second beam component 56b, i.e., 180 degrees apart. Otherwise, a single cube corner 14 with its front surface facing the first beam component 56a would later have its rear surface facing the second beam component 56b in the revolution.

Figure 7:
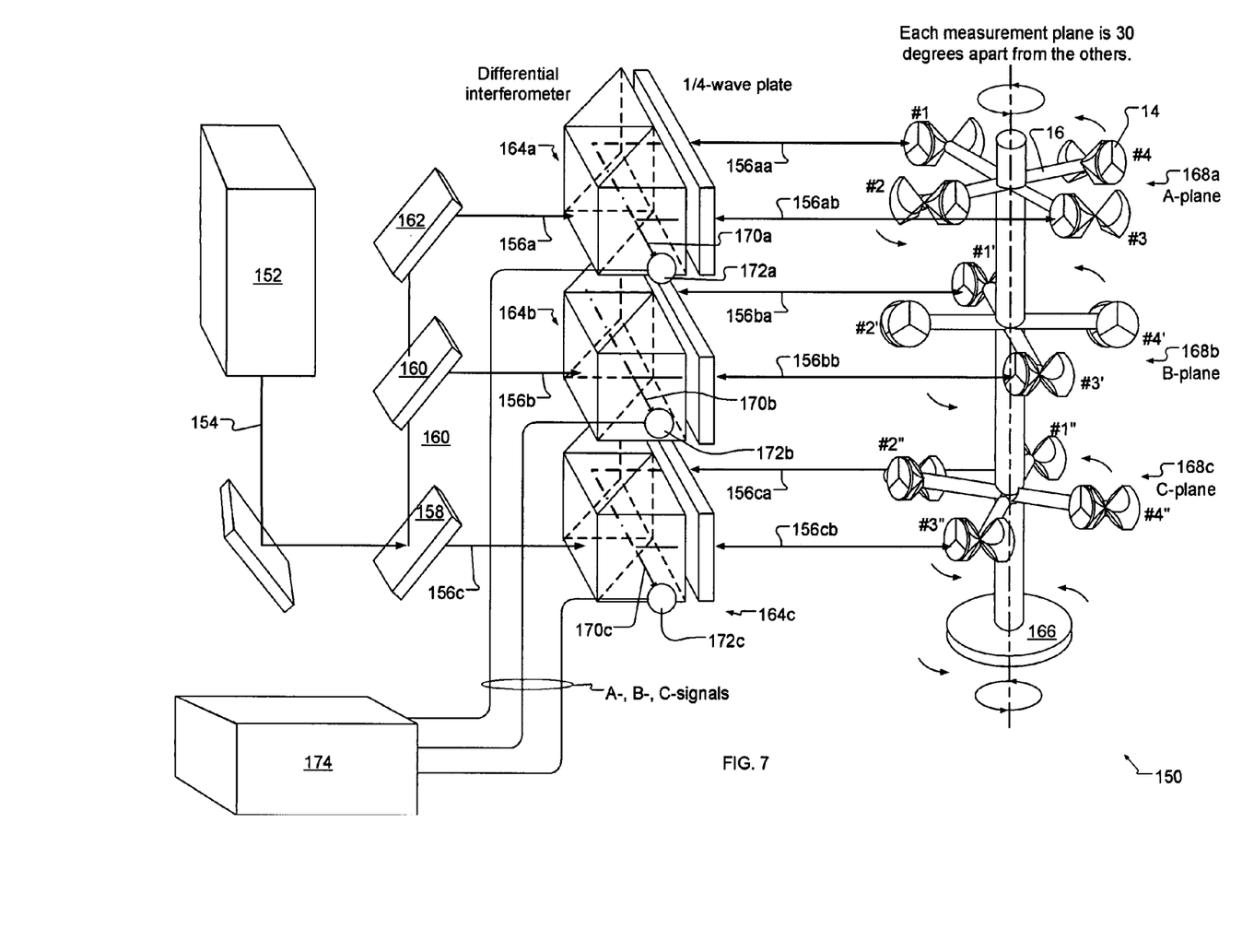
FIG. 7 is a perspective side view of a rotational measurement system employing a Zeeman-type laser interferometer to perform rotation measurement following the process in FIG. 6A-C.

By study of the exemplary rotational measurement systems 10, 50 (and 150) it can be seen that the present invention is applicable to various types of laser interferometers, including the Michelson-type laser interferometer, the dual-frequency Zeeman-type laser interferometer, or the laser Doppler displacement sensor, as long as there is adequate laser beam power to be used in multiple axes measurement. Multiple laser head units can also be used as long as the measurement electronics can be triggered and synchronized so that there is no loss of signals during the change over of cube corners.

Figure 6A:
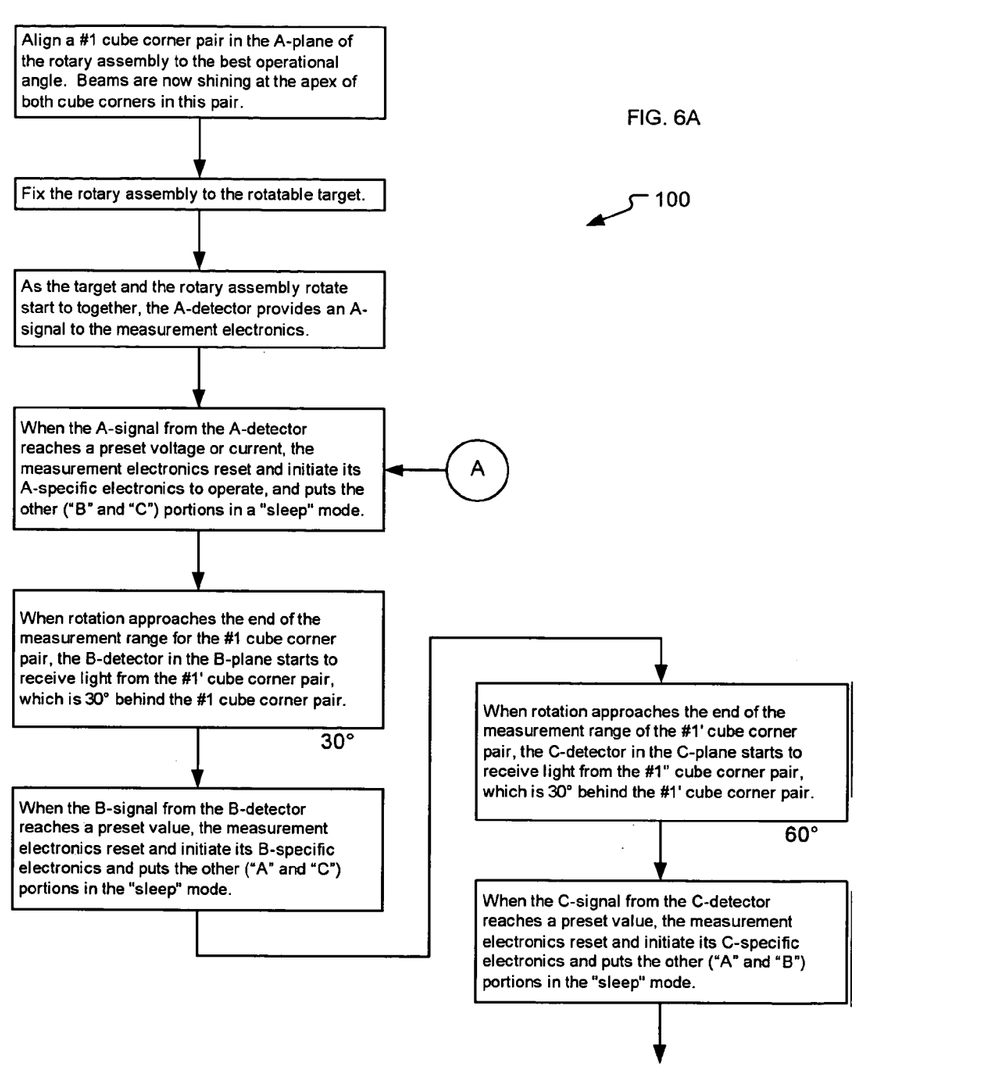
Figure 6B:
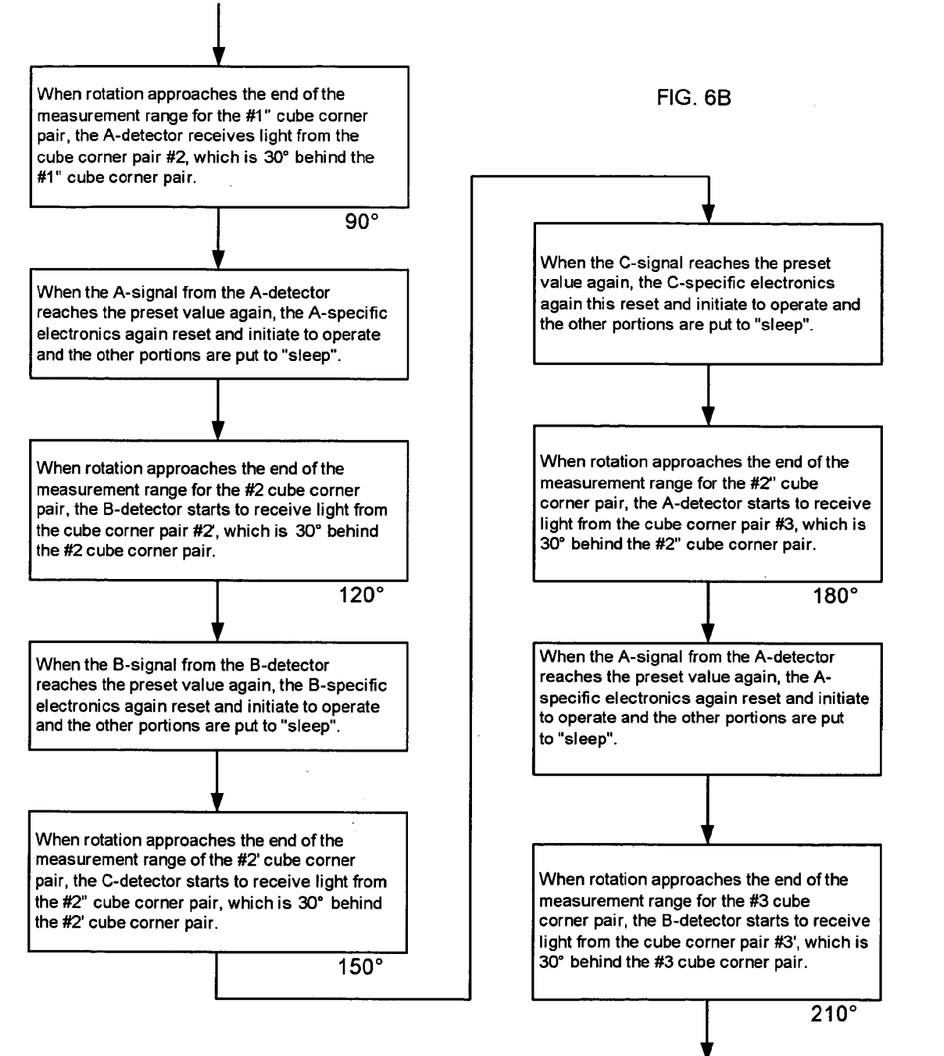
Figure 6C:
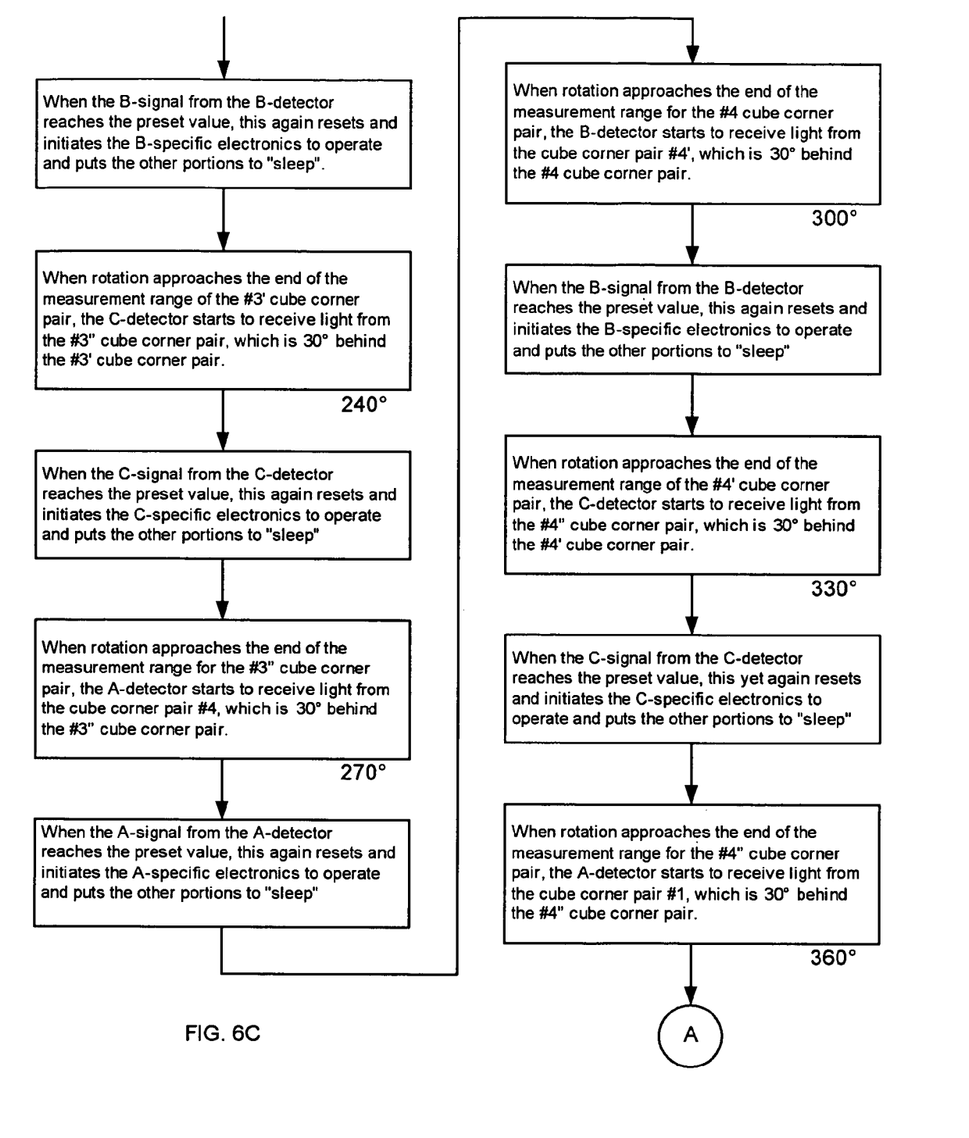

FIG. 6A-C (extending across three pages) is a flow chart showing a process 100 suitable for measurement in three planes, with each plane having four cube corner pairs that are 90° apart (e.g., as in the apparatus of FIG. 4 or FIG. 7 (discussed presently)). An algorithm for a configuration consisting of two measurement planes, with each plane having six cube corner pairs (i.e. 60° apart), is conceptually similar.

FIG. 7 is a perspective side view of a rotational measurement system 150 employing a Zeeman-type laser interferometer to perform rotation measurement following the process 100 in FIG. 6A-C. A laser head 152 provides a laser beam 154 that is first split into three beam components 156a–c by a 33/67% beam splitter 158 and a 50% beam splitter 160. These beam splitters 158, 160 and a beam bender 162 then align the three beam components 156a–c, as shown, so that they pass through three respective differential interferometers 164a–c to a rotary assembly 166 having paired cube corners 14 on three planes 168a–c.

During initial alignment, any one of the planes 168a–c can be used as the primary plane for measurement. Thus, one of the laser beam components 156a–c is aligned to the optimum angular position of a paired set of cube corners 14 in a measurement plane so that measurement can be initiated. Since the angular configuration between any of the measurement planes is 30° apart, the rotated angle can always fall into the measurement range of one of the twelve pairs of cube corners 14.

Assuming the top plane, plane 168a, is chosen as the primary one, the top laser beam component 156a will enter the top differential interferometer 164a, which splits the laser beam component 156a into two parallel measuring beams 156aa, 156ab that are directed towards two cube corners 14 that are mounted on the same mechanical arm 16 in plane 168a of the rotary assembly 166. The rotation of the rotary assembly 166 then causes the frequencies of these two measuring beams 156aa, 156ab to be Doppler-shifted. One of the measuring beams 156aa, 156ab is shifted up in frequency and the other is shifted down, because the two cube corners 14 are moving in opposite directions. The returning measuring beams 156aa, 156ab then re-enter the differential interferometer 164a and are recombined, forming a detection beam 170a. An interference signal is generated between these two returning laser measuring beams 156aa, 156ab and the frequency difference is detected by a detector 172a and processed by measurement electronics 174.

[Of course, the same process can take place with respect to the other planes 168b, 168c. The second differential interferometer 164b is used to provide measuring beams 156ba, 156bb that result in a detection beam 170b that is detected by a second detector 172b for processing by the measurement electronics 174. And the third differential interferometer 164c is used to provide measuring beams 156ca, 156cb that result in a detection beam 170c that is detected by a third detector 172c for processing by the measurement electronics 174.]

The frequency differences in the respective detection beams 170a–c are directly proportional to the moving velocity of the cube corners 14. Accordingly, integration over time gives the total displacement of those cube corners 14. Since the length of the mechanical arms 16 between sets of the cube corners 14 can be known and fixed, the angular amount of rotation that has occurred in the rotary assembly 166 can be calculated.

The differential interferometers 164a–c offer an advantage in measurement accuracy. Since the measurement is performed in differential in manner, the result is independent of centering measurement on the rotational axis of the target object that the rotary assembly 166 is attached to. The rotary assembly 166 can therefore be placed close to but not necessarily exactly on that rotational axis and the rotational measurement system 150 here can still provide accurate results.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

SYSTEM FOR ROTATION MEASUREMENT WITH LASER INTERFEROMETRY
Inventor: TSAI, John C.
Atty. ref.: 60154.302301
THIS CORRESPONDENCE CHART IS FOR EASE OF UNDERSTANDING AND INFORMATIONAL PURPOSES ONLY, AND DOES NOT FORM A PART OF THE FORMAL PATENT APPLICATION

| | |
|---|---|
| 10 | rotational measurement system |
| 12 | rotary assembly |
| 14, 14a–b | cube corners |
| 16 | mechanical arm |
| 18 | interferometer |
| 20 | laser beam |
| 22 | detection beam |
| 24 | reference beam component |
| 26 | beam components 24, |
| 26 | measuring beam component |
| 28 | beam splitter portion |
| 30 | cube corner portion |
| 40 | rotary assembly |
| 42a–c | measurement planes |
| 50 | rotational measurement system |
| 52 | beam splitter |
| 54 | beam bender |
| 56a–b | beam components |
| 58 | detection beam |
| 100 | process |
| 150 | rotational measurement system |
| 152 | laser head |
| 154 | laser beam |
| 156a–c | beam components |
| 156aa, 156ab | measuring beams |
| 156ba, 156bb | measuring beams |
| 156ca, 156cb | measuring beams |
| 158 | beam splitter |
| 160 | beam splitter |
| 162 | beam bender |
| 164a–c | interferometers |
| 166 | rotary assembly |
| 168a–c | planes |
| 170a–c | detection beams |
| 172a–c | detectors |
| 174 | measurement electronics |

What is claimed is:

1. An apparatus for use in rotational measurement, comprising:

a rotational assembly to rotate about a rotational axis;

at least two interferometers, each to receive a respective light beam, to separate said respective light beam into both a respective reference beam and a respective measuring beam, to direct said respective measuring beam to said rotational assembly, and to receive said respective measuring beam back from said rotational assembly;

said rotational assembly including a plurality of cube corners mounted such that at least one of said cube corners is able to receive from and reflect back to one said interferometer a respective said measuring beam as said rotational assembly rotates about said rotational axis; and said interferometers each further to combine its said respective reference beam with its said respective measuring beam into a respective detection beam, wherein at least one said respective detection beam includes an interference signal; thereby permitting rotational measurement of said rotational assembly and any attached work piece target based on processing of said interference signal.

2. The apparatus of claim 1, wherein:
- each said interferometer is mounted in a different plane, to direct its said respective measuring beam to said rotational assembly and to receive its said respective measuring beam back from said rotational assembly in that respective said plane; and
- said rotational assembly has a sub-plurality of said plurality of cube corners mounted in each respective said plane to receive from and reflect back said respective measuring beam of the respective said interferometer in that respective said plane.

3. The apparatus of claim 1, wherein said interferometers are linear mode interferometers.

4. The apparatus of claim 1, wherein said interferometers are differential mode interferometers.

5. A method to measure rotation in a full circle of a target object, comprising:
- placing a rotary assembly of multiple cube corner pairs distributed evenly over the full circle;
- providing measuring and reference laser beams of a laser interferometer or laser doppler displacement sensor;
- directing said measuring laser beams to at least one said cube corner pair such that at least said measuring laser beam is reflected;
- combining said measuring laser beams that are reflected with said reference laser beams to obtain at least one detection beam including an interference signal;
- processing said interference signal to determine the rotation of the target object; and
- applying the rotation thus determined in an industrial manufacturing process or in a laboratory process employing the target object.

6. The method of claim 5, wherein the rotational center of the target object is known, the method further comprising:
- mounting said rotary assembly coaxial with the rotational center, thereby permitting measurement in a linear mode to be used.

7. The method of claim 5, wherein:
- said providing includes providing a first said measuring laser beam and a second said measuring laser beam; and
- said combining includes differentially combining said first said measuring laser beam and said second said measuring laser beam, thereby permitting differential mode measurement regardless of whether the rotational center of the target object and said rotary assembly are coaxial.

* * * * *